(12) United States Patent
Kääriäinen

(10) Patent No.: US 8,950,106 B2
(45) Date of Patent: Feb. 10, 2015

(54) FLASHER

(76) Inventor: Vesa Kääriäinen, Mikkeli (FI)

( * ) Notice: Subject to any disclaimer, the term of this patent is extended or adjusted under 35 U.S.C. 154(b) by 589 days.

(21) Appl. No.: 12/562,175

(22) Filed: Sep. 18, 2009

(65) Prior Publication Data
US 2010/0071251 A1 Mar. 25, 2010

(30) Foreign Application Priority Data

Sep. 19, 2008 (FI) .................................. 20085885
Feb. 26, 2009 (FI) .................................. 20095184

(51) Int. Cl.
A01K 85/14 (2006.01)
A01K 85/18 (2006.01)
A01K 91/08 (2006.01)

(52) U.S. Cl.
CPC ...................... A01K 85/14 (2013.01)
USPC ......... 43/42.18; 43/42.15; 43/42.23; 43/42.5; 43/43.13

(58) Field of Classification Search
USPC .............. 43/42.15, 42.18, 42.5, 42.51, 42.52, 43/42.23, 42.22, 42.49, 43.13
See application file for complete search history.

(56) References Cited

U.S. PATENT DOCUMENTS

| | | | | |
|---|---|---|---|---|
| 857,883 A * | 6/1907 | Kreisser | ........................ | 43/42.15 |
| 1,019,926 A * | 3/1912 | Staples | ........................... | 43/42.5 |
| 1,239,956 A * | 9/1917 | Phinney | ........................ | 43/42.23 |
| 1,300,488 A * | 4/1919 | Robinson | ..................... | 43/42.18 |
| 1,332,112 A * | 2/1920 | Duhamel | ..................... | 43/42.18 |
| 1,333,154 A * | 3/1920 | Buddle | ......................... | 43/42.23 |
| 1,418,229 A * | 5/1922 | Buddle | ......................... | 43/42.18 |
| 1,598,958 A * | 9/1926 | Crosby | .......................... | 43/42.5 |
| 1,608,375 A * | 11/1926 | Dewey | ......................... | 43/42.23 |
| 1,622,063 A * | 3/1927 | Steenstrup | ................... | 43/42.15 |
| 1,733,777 A * | 10/1929 | Comstock | ................... | 43/42.23 |
| 1,802,295 A * | 4/1931 | Wear | .............................. | 43/42.13 |
| 2,032,819 A * | 3/1936 | Tengel | ......................... | 43/42.18 |
| 2,037,310 A * | 4/1936 | Bryan | .......................... | 43/42.09 |
| 2,043,001 A * | 6/1936 | Lambrecht | .................... | 43/42.5 |
| 2,214,266 A * | 9/1940 | Haury | .......................... | 43/42.52 |
| 2,244,378 A * | 6/1941 | Turner | ......................... | 43/42.14 |
| 2,306,640 A * | 12/1942 | Nelson | ......................... | 43/42.14 |
| 2,545,185 A * | 3/1951 | Winslow | ...................... | 43/43.13 |
| 2,556,423 A * | 6/1951 | Gross | .......................... | 43/43.13 |
| 2,588,720 A * | 3/1952 | Heiland | ......................... | 43/42.5 |
| 2,595,168 A * | 4/1952 | Roth | ............................ | 43/42.15 |
| 2,597,317 A * | 5/1952 | Gross | .......................... | 43/43.13 |
| 2,705,848 A * | 4/1955 | Stettner | ....................... | 43/42.52 |
| 2,726,475 A * | 12/1955 | Wiselka | ...................... | 43/43.13 |
| 2,795,075 A * | 6/1957 | Christian | ....................... | 43/42.5 |
| 2,805,512 A * | 9/1957 | Bunce | ......................... | 43/42.18 |
| 2,891,344 A * | 6/1959 | Hottowe | ........................ | 43/42.5 |
| 3,056,228 A * | 10/1962 | Stackhouse | ................. | 43/42.51 |
| 3,153,298 A * | 10/1964 | Lemon | ......................... | 43/43.13 |

(Continued)

FOREIGN PATENT DOCUMENTS

| | | | | |
|---|---|---|---|---|
| CH | 679102 A5 | * 12/1991 | ............. | A01K 85/14 |
| JP | 10286045 A | * 10/1998 | ............. | A01K 85/18 |
| JP | 2004267023 A | * 9/2004 | ............. | A01K 85/14 |

Primary Examiner — Darren W Ark
(74) Attorney, Agent, or Firm — Fildes & Outland, P.C.

(57) ABSTRACT

The invention relates to a flasher, which has attachment points at two opposite ends for a line or hook used in fishing. The flasher includes two plate pieces, between which a connection is arranged, which permits the mutual movement of the plate pieces.

5 Claims, 3 Drawing Sheets

(56) References Cited

U.S. PATENT DOCUMENTS

| | | | | |
|---|---|---|---|---|
| D203,192 S * | 12/1965 | Hiatt | .............................. | D22/129 |
| 3,229,407 A * | 1/1966 | Quyle | .............................. | 43/42.5 |
| 3,230,658 A * | 1/1966 | Wuotila | .............................. | 43/42.5 |
| 3,492,755 A * | 2/1970 | Sundblad | .............................. | 43/42.5 |
| 3,543,431 A * | 12/1970 | Olds | .............................. | 43/43.13 |
| 3,656,253 A * | 4/1972 | Gaunt | .............................. | 43/42.51 |
| 3,673,727 A * | 7/1972 | Bauer | .............................. | 43/42.5 |
| 4,122,624 A * | 10/1978 | Smith | .............................. | 43/42.5 |
| 4,142,318 A * | 3/1979 | Morrell | .............................. | 43/42.5 |
| 4,161,078 A * | 7/1979 | Pagani | .............................. | 43/43.13 |
| 4,201,006 A * | 5/1980 | Wetherald | .............................. | 43/42.51 |
| 4,237,644 A * | 12/1980 | Hansen | .............................. | 43/43.13 |
| 4,486,970 A * | 12/1984 | Larson | .............................. | 43/43.13 |
| 4,501,087 A * | 2/1985 | Blomquist | .............................. | 43/42.51 |
| 4,507,892 A * | 4/1985 | Ochs | .............................. | 43/42.5 |
| D281,191 S * | 10/1985 | Marx, Jr. | .............................. | D22/129 |
| 4,733,492 A * | 3/1988 | Thompson | .............................. | 43/43.13 |
| 4,936,042 A * | 6/1990 | Causey | .............................. | 43/42.16 |
| 5,058,310 A * | 10/1991 | Andersen | .............................. | 43/42.15 |
| 5,384,979 A * | 1/1995 | Davis | .............................. | 43/42.5 |
| D360,014 S * | 7/1995 | Davis | .............................. | D22/129 |
| 5,970,648 A * | 10/1999 | DeRose | .............................. | 43/42.51 |
| 6,082,037 A * | 7/2000 | Malouf et al. | .............................. | 43/42.5 |
| 6,108,964 A * | 8/2000 | Noorlander | .............................. | 43/42.5 |
| 6,279,260 B1 * | 8/2001 | Farr et al. | .............................. | 43/42.5 |
| 6,493,984 B1 * | 12/2002 | Bechhold | .............................. | 43/42.51 |
| 6,643,975 B1 * | 11/2003 | Edwards | .............................. | 43/42.51 |
| 6,655,074 B2 * | 12/2003 | Pentland | .............................. | 43/42.5 |
| 7,216,456 B2 * | 5/2007 | Kaariainen et al. | .............................. | 43/42.5 |
| 7,493,724 B1 * | 2/2009 | Peterson | .............................. | 43/42.5 |
| 7,610,713 B1 * | 11/2009 | Eilers | .............................. | 43/43.13 |
| 8,245,437 B1 * | 8/2012 | Yelton | .............................. | 43/42.5 |
| 8,413,367 B1 * | 4/2013 | Stirtz | .............................. | 43/43.13 |
| 2005/0252069 A1 * | 11/2005 | Pool et al. | .............................. | 43/42.51 |
| 2006/0005456 A1 * | 1/2006 | Harris et al. | .............................. | 43/42.06 |
| 2006/0005457 A1 * | 1/2006 | Harris et al. | .............................. | 43/42.06 |
| 2006/0168874 A1 * | 8/2006 | Hull | .............................. | 43/43.13 |
| 2008/0172925 A1 * | 7/2008 | Hazel | .............................. | 43/43.13 |
| 2011/0197492 A1 * | 8/2011 | Fowler | .............................. | 43/42.22 |

* cited by examiner

FLASHER

BACKGROUND OF THE INVENTION

1. Field of the Invention

The present invention relates to a flasher, which has attachment points at two opposite ends for a line or hook used in fishing.

2. Description of the Prior Art

One known flasher is disclosed in the applicant's own FI patent number 116190. By means of the flasher in question, different types and magnitudes of swimming motion, which can, in addition, be adjusted, can be created in a lure. The flasher is manufactured by molding from plastic. Thus, the matter is of a rigid plastic piece, the swimming motion created by which depends on how the line is attached to the flasher. The swimming motion is also affected by the location of the trace attached to the flasher.

The known flasher achieves a sure, but unsurprisingly, barrel-like swimming motion. The speed of rotation can be slightly influenced by altering the pulling speed, but the direction of the rotary motion can only be changed by altering the attachment point of the line. In addition, the manufacture of the flasher requires a mold, which increases manufacturing costs and reduces the possibility of varying the product. The most significant problem is the lifelessness of the swimming motion, though the sure rotation brings a clear advantage, compared to other known flashers.

OBJECTS AND SUMMARY OF THE INVENTION

The invention is intended to create a new type of flasher, the swimming motion of which is not only more diverse than previously, but also more surprising than previously.

The flasher has attachment points at two opposite ends for a line or hook used in fishing, and it includes two plate pieces, between which a connection is arranged, which permits the mutual movement of the plate pieces. Attachment points may be arranged in each of the two plate pieces. The connection may be formed by ring elements. The ring elements may be formed by two detachably attached rings.

The ring elements may be arranged to permit mutual movement in at least one direction between the plate pieces. The plate pieces may be arranged to form a symmetrical shape relative to the longitudinal centre line of the flasher. The plate pieces may be arranged consecutively and a guide fin may be arranged in the direction of movement of the flasher in the rearmost plate piece. The plate pieces may be planar.

A frontmost attachment point in the direction of movement of the flasher may include two opening pairs, which are arranged symmetrically relative to the longitudinal center line of the flasher. A rearmost attachment point in the direction of movement of the flasher may include two openings, which are arranged symmetrically relative to the longitudinal center line of the flasher.

The construction of the flasher according to the invention is not only simple, but also new and surprising. Its exceptional construction gives the flasher a swimming motion that is, on the one hand controlled, but on the other hand random. Thus, the flasher increases the attractiveness of the lure to fish, without any actions by the user. However, the flasher can, in addition, be adjusted diversely.

In the following, the invention is described in detail with reference to the accompanying drawings depicting some applications of the invention.

DETAILED DESCRIPTION OF THE PREFERRED EMBODIMENTS

Figure 1A:
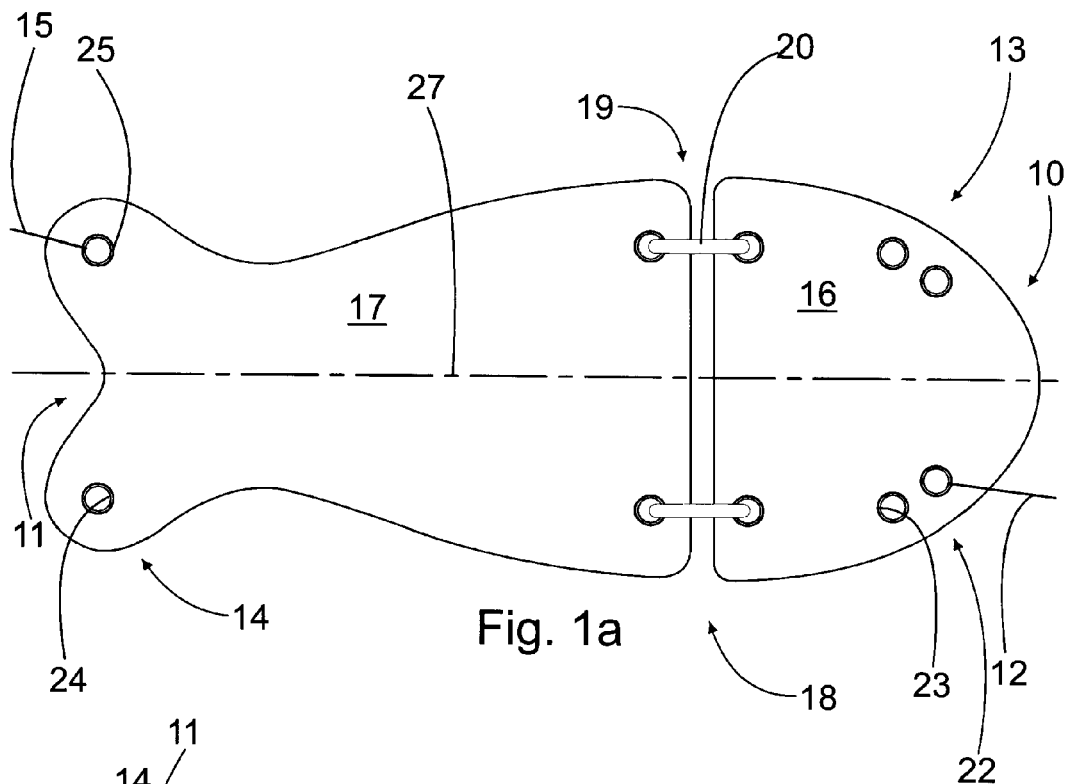
FIG. 1a shows a top view of the flasher according to the invention.

FIG. 1a shows the flasher according to the invention, which is intended for fishing. At the two opposite ends 10 and 11 of the flasher, there are attachment points 13 and 14, which are for the line 12 used when fishing. In practice, the line 12 is attached to the first end 10 of the flasher, from the fishing device, for example, a reel connected to a rod. Correspondingly, a shortish length of line 15, to which the actual lure (not shown) is attached, is attached to the second end 11 of the flasher. The part of line in question is also referred to as the trace. Particularly when fishing for predatory fish, a baitholder containing bait made from the prey fish, is used as a lure. In its main features, the flasher is used in the manner described in Finnish patent number 116190.

The flasher according to the invention includes two plate pieces 16 and 17, between which a connection 18 permitting the mutual movement of the plate pieces 16 and 17 is arranged. Thus, the mutual attitude and/or position of the plate pieces changes during fishing, which makes the swimming motion of the flasher surprising, thus increasing its attraction to fish. In its main features, the swimming motion is generally barrel-like, but, thanks to the new type of construction, the rotary motion can also suddenly change. The change is random and does not require any actions by the user, such as changing the pulling speed. The movement of the flasher will be examined in greater detail hereinafter.

The construction of the flasher can vary in different applications. At its simplest, the flasher comprises two plate pieces 16 and 17, in each of which at least some of the attachment points 13 and 14 are arranged. In other words, the pulling line is in the first plate piece and the trace is in the latter plate piece. Thus, the flasher seeks to mainly remain straight, maintaining the desired swimming motion, which nevertheless varies randomly as the mutual attitude of the plate pieces changes.

The connection can be made in many ways. The connection 18 preferably consists of ring elements 19, which achieve sufficient sensitivity while also keeping the construction simple and the pulling resistance small. There are connection openings 26 in the plate pieces 16 and 17 for the ring elements 19. In the embodiments described, the ring elements 19 consist of two detachably attached rings 20. In this way, the properties of the flasher can be altered by changing the rings. Particularly the size of the rings affects the sensitivity of the flasher to change the swimming motion. The play created by the rings is also crucial. The rings are larger than the connection openings and, when pulled, the plate pieces are separate from each other, so that the connection is sensitive. According to the invention the ring elements are arranged to permit mutual movement in at least one direction between the plate pieces. Thus, for example, the changes caused by the prevailing flow make the mutual attitude of the plate pieces change suddenly, so that a completely new kind of swimming motion is achieved. In other words, when the attitude of the plate pieces changes, the shape of the flasher changes, in which case the flasher can even change its direction of rotation. At least, the flasher jerks surprisingly to a different direction, usually the opposite direction. The swimming motion in question looks exactly like the surprising change in direction of a real fish. In addition, the plate pieces are arranged to form a symmetrical shape relative to the longitudinal center line of the flasher. This achieves a similar swimming motion in both directions while the pulling resistance remains the same. In other words, a change in the direction of rotation does not induce a detrimental jerk in the line.

Figure 1B:
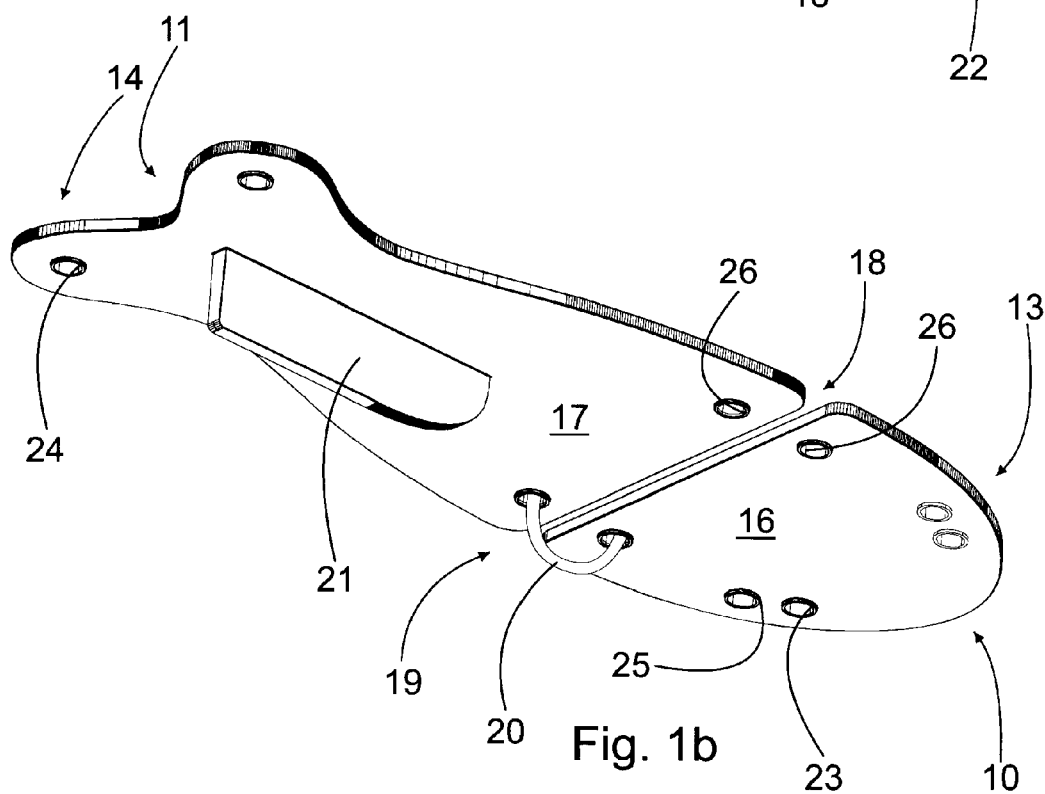
FIG. 1b shows the flasher according to the invention, seen at an angle from in front.

In the embodiment shown in FIGS. 1a and 1b, the plate pieces 16 and 17 are arranged one after the other. In addition, FIG. 1b shows only one of the rings 20. In this case, a guide fin 21 is also fitted to the rear plate piece 17. The guide fin helps to maintain the direction of motion of the flasher and prevents unnecessary rotation around its own longitudinal axis, thus preserving a barrel-like swimming motion. The shaping and dimensioning of the guide fin can vary and it can be fitted to one or both sides of the plate piece.

Adjustment of the swimming motion of the flasher is achieved by arranging, at the front attachment point 13, two pairs of openings 22, which are arranged symmetrically to the longitudinal center line 27 of the flasher. The adjustment properties can be further diversified by arranging two openings 24, which are arranged symmetrically to the longitudinal center line 27 of the flasher, at the two rearmost attachment points 14. Differing from the description, the number and placing of the openings can vary. However, the placing of the openings is preferably kept symmetrical, so that adjustment will remain simple. The center line 27 is shown by a dot-and-dash line in FIGS. 1a and 3.

Figure 2A:
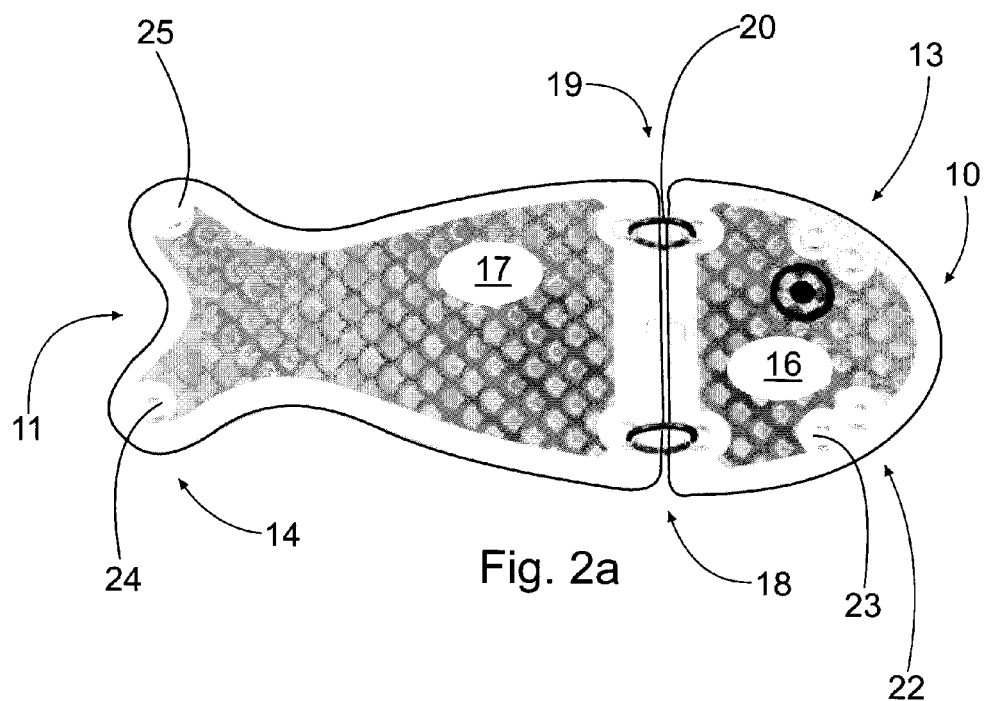
FIG. 2a shows the flasher according to FIG. 1a equipped with tapes.
Figure 2B:
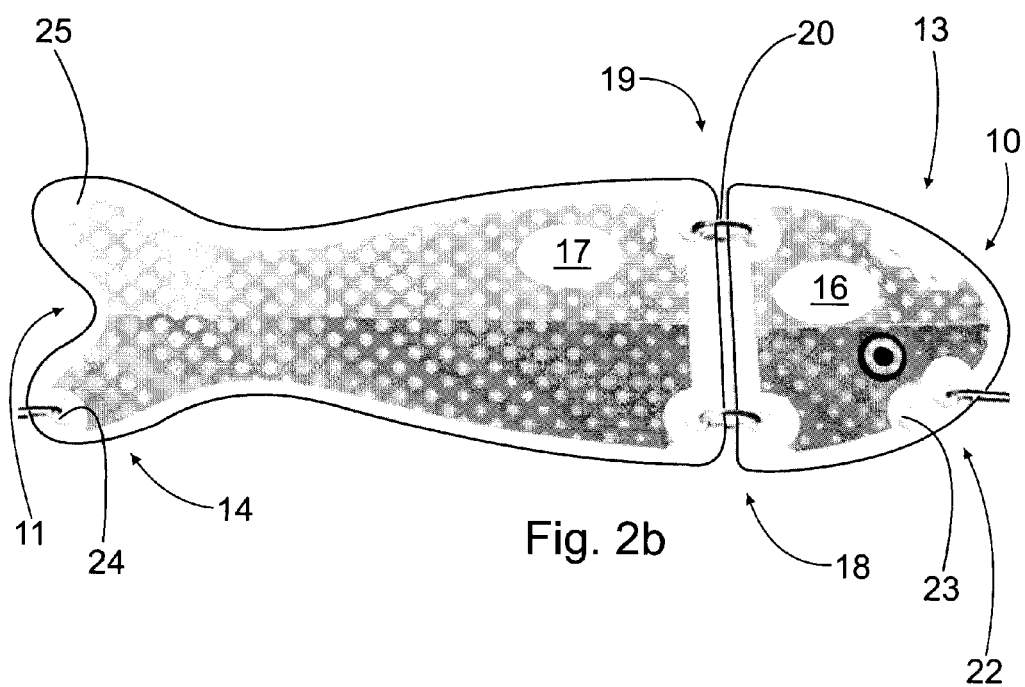
FIG. 2b shows an adaptation of the flasher of FIG. 2a, and FIG. 3 shows a lure application of the flasher according to the invention.

The desired swimming motion will be achieved, even though the plate pieces are planar. At the same time, however, the manufacture of the flasher will remain simple. One way to manufacture the flasher according to the invention is first of all to cut the plate pieces from a sheet of plastic and machine the desired number of openings in them. In addition, the openings 23 and 24 are preferably reinforced with metal grommets 25. Instead of plastic, the flasher can even be manufactured from metal. However, the lightness and easy handling of plastic make it a good manufacturing material. Two-sided reflector tapes can be glued to one or both sides of the flasher (FIGS. 2a and 2b). The taping will particularly improve the reflection of light beams. Molding can also be used in manufacture, in which case dimensionally accurate pieces will be achieved simply. Instead of clear transparent plastic, colored grades of plastic can be used while various patterns and colors can be selected for the reflector tapes. The size and shape of the reflector tape can also be altered.

One flasher according to the invention is about 250-mm long and about 100-mm wide at its widest point. The thickness of the plastic pieces in the flasher in question is about 2 mm. The size of the flasher can be altered while keeping the size ratios essentially the same. The flashers in FIGS. 2a and 2b are to different scales. The length of the flasher of FIG. 2a is about 150 mm while the length of the flasher of FIG. 2b is about 250 mm. The rear part of the longer flasher is more elongated than that of the shorter flasher, which for its part affects the swimming motion. In practice, the swimming motion of the longer flasher is slightly smoother, thus seeming more like a predatory fish seeking prey than a prey fish. By means of suitable dimensioning, two or more different types of rear piece can be attached to one type of front piece. In addition, by means of the dimensioning of the line and the trace and the selection of their attachment points, the lure can be given the desired swimming motion. In addition to this, the flasher creates reflections by its own movement, which attract fish to the vicinity of the lure.

Figure 3:
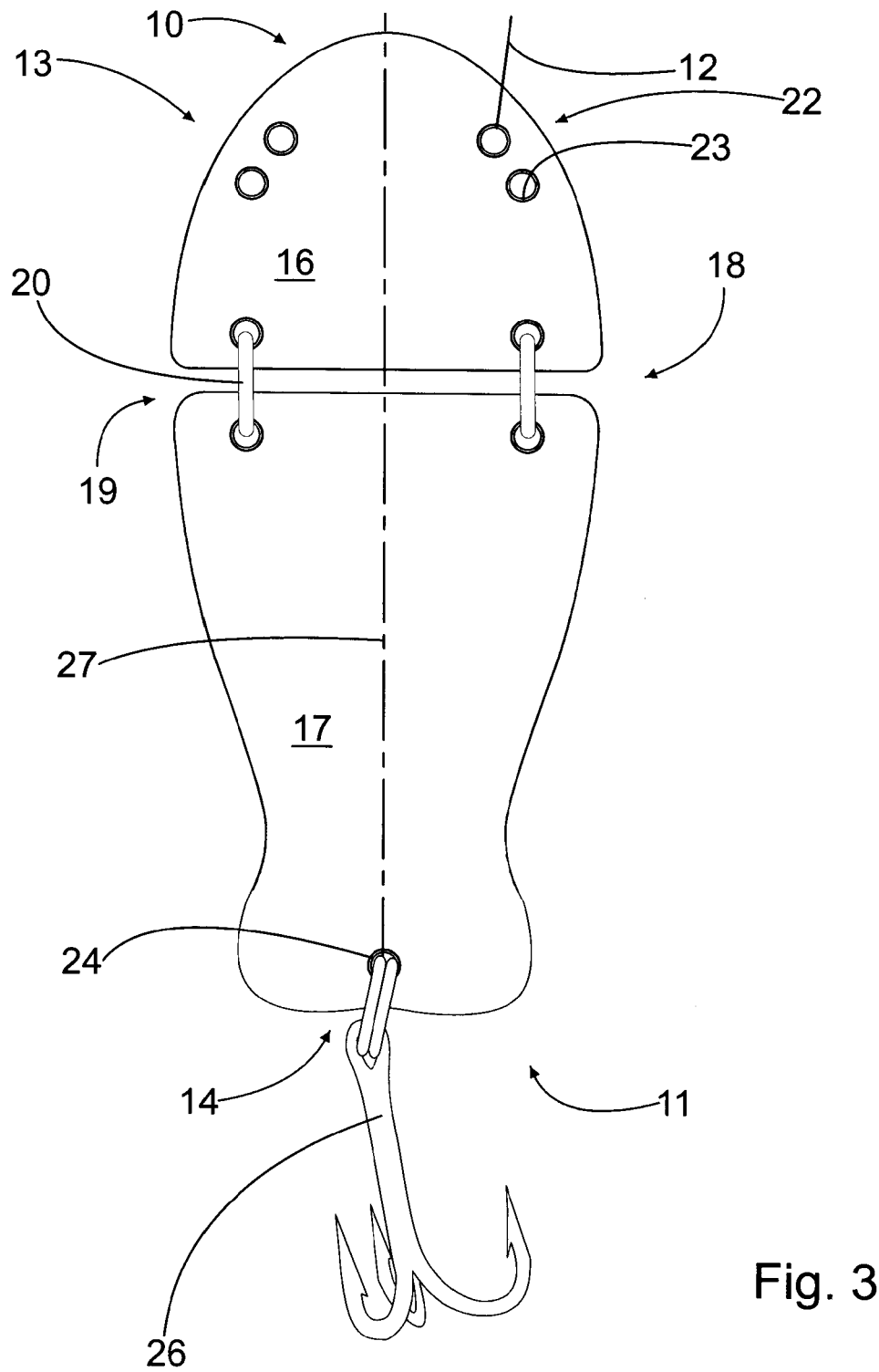

FIG. 3 shows a lure adaptation of the flasher according to the invention. In this, instead of a line, a hook 26 is attached to the rearmost plate piece. The unique swimming motion makes the lure attractive to fish. There can also be more than one hook. A hook can also be attached to the front plate piece.

In addition to the number and location of the openings, the movement of the flasher is substantially affected by the movement of the annular attachments, both parallel to the plate pieces and also slightly in the transverse direction. The movements in question substantially affect the irregular swimming of the flasher. However, the movements do not affect the up-and-down motion of the flasher. The flasher according to the invention is also characterized by a comprehensive adjustment possibility. The plate-like flasher can be made to make repeated movements from up to down, which are lacking in known flasher plates. The swimming motion of the flasher can also be adjusted to be highly exceptional, in which case it gives the lure towed after it a very irregular swimming motion. In addition, the flasher according to the invention changes its direction of rotation from time to time, which property is entirely lacking in known flasher plates. The change in direction is also very activating to predatory fish. In addition, the shape and swimming motion of the flasher reduce the pulling resistance, which is considerably smaller than that of other flasher plates of the same order of size. In tests, it has also been demonstrated that the pulling resistance of the flasher is even smaller than in the applicant's earlier flasher plate. Thus, the new flasher can be used in planing. The flasher according to the invention can even be adjusted to rotate clockwise or counterclockwise. This property is advantageous, be the lure coming behind the flasher can be set to rotate in the opposite direction, in which case so-called cross-rotation will be achieved. The flasher imitates a predatory fish seeking prey, in order to attract other predatory fish to the place. At the same time, the flasher gives the lure, preferably a trace, coming behind it a very irregular swimming motion, which helps to trigger feeding by predatory fish. The swimming of the flasher recalls, for example, a salmon seeking prey.

The invention claimed is:

1. A flasher for a line used in fishing, the flasher comprising:
    two plate pieces connected together by ring elements arranged between said two plate pieces, the ring elements permitting mutual movement between said two plate pieces in at least one direction by the movement of the ring elements both parallel to said two plate pieces and also slightly in a transverse direction;
    said two plate pieces defining a front end and an opposite back end of said flasher; and
    attachment points for said fishing line, said attachment points being arranged in each of said two plate pieces at said front end and said back end;
    the attachment points in said front end including two pairs of openings arranged symmetrically relative to a longitudinal centerline of the flasher spaced from and disposed on either side of said centerline for creating a barrel-like, rotary swimming motion, each of the openings of the two pairs of openings being formed through one of said two plate pieces by extending transversely through the one of said two plate pieces from a top side to a bottom side thereof, and said fishing line being attachable directly to one of the openings of the two pairs of openings;

the attachment points in said back end include two openings arranged symmetrically relative to the longitudinal centerline of the flasher.

2. The flasher according to claim 1, characterized in that the ring elements are detachably attachable rings.

3. The flasher according to claim 1, characterized in that the plate pieces are arranged to form a symmetrical shape relative to the longitudinal centerline of the flasher.

4. The flasher according to claim 1, characterized in that the plate pieces are arranged consecutively and a guide fin is arranged in the plate piece defining the back end.

5. The flasher according to claim 1, characterized in that the plate pieces are planar.

* * * * *